(12) United States Patent
Stewart et al.

(10) Patent No.: US 11,854,537 B2
(45) Date of Patent: Dec. 26, 2023

(54) SYSTEMS AND METHODS FOR PARSING AND CORRELATING SOLICITATION VIDEO CONTENT

(71) Applicant: MY JOB MATCHER, INC., Austin, TX (US)

(72) Inventors: Arran Stewart, Austin, TX (US); Steve O'Brien, Raleigh, NC (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 18/103,713

(22) Filed: Jan. 31, 2023

(65) Prior Publication Data

US 2023/0178073 A1 Jun. 8, 2023

Related U.S. Application Data

(63) Continuation of application No. 17/487,157, filed on Sep. 28, 2021, now Pat. No. 11,574,629.

(51) Int. Cl.
*G10L 15/18* (2013.01)
*G06V 20/40* (2022.01)
*G10L 25/57* (2013.01)
*G06V 10/94* (2022.01)

(52) U.S. Cl.
CPC ............ *G10L 15/18* (2013.01); *G06V 20/41* (2022.01); *G06V 10/95* (2022.01); *G10L 25/57* (2013.01)

(58) Field of Classification Search
CPC ......... G10L 15/18; G10L 25/57; G10L 15/26; G06V 20/41; G06V 10/95; G06Q 10/06; G06Q 10/1053
USPC ............................................. 382/159
See application file for complete search history.

(56) References Cited

U.S. PATENT DOCUMENTS

| | | | | |
|---|---|---|---|---|
| 9,361,084 | B1 * | 6/2016 | Costa | G10L 15/22 |
| 2018/0068173 | A1 * | 3/2018 | Kolleri | G06Q 10/10 |
| 2018/0167678 | A1 * | 6/2018 | Clerx | H04N 21/4667 |
| 2020/0043287 | A1 * | 2/2020 | Zhang | G06V 40/103 |
| 2020/0210957 | A1 * | 7/2020 | Gaspar | G06Q 10/1053 |

* cited by examiner

*Primary Examiner* — Charlotte M Baker
(74) *Attorney, Agent, or Firm* — Caldwell Intellectual Property Law, LLC

(57) ABSTRACT

Aspects relate to systems and methods for parsing and correlating solicitation video content. An exemplary system includes a computing device configured to receive a solicitation video related to a subject, where the solicitation video includes at least an image component and at least an audio component, where the audio component includes audible verbal content related to at least an attribute of the subject, transcribe at least a keyword as a function of the audio component, and associate the subject with at least a job description as a function of the at least a keyword.

16 Claims, 13 Drawing Sheets

SYSTEMS AND METHODS FOR PARSING AND CORRELATING SOLICITATION VIDEO CONTENT

This application is a continuation of Non-provisional application Ser. No. 17/487,157 filed on Sep. 28, 2021, and entitled "SYSTEMS AND METHODS FOR PARSING AND CORRELATING SOLICITATION VIDEO CONTENT," the entirety of which is incorporated herein by reference.

FIELD OF THE INVENTION

The present invention generally relates to the field of selective visual display systems. In particular, the present invention is directed to systems and methods for parsing and correlating solicitation video content.

BACKGROUND

Video content (including short-form personal video content) has steadily been gaining in popularity for many years. Its advantages as a communication medium are manifest. However, present ways of doing business, which are commonly reliant upon the written word, are not capable of making optimal use of this form of media.

SUMMARY OF THE DISCLOSURE

In an aspect, a system for parsing and correlating solicitation video content is described. the system includes a computing device configured to: receive a solicitation video related to a subject, wherein the solicitation video includes at least an image component, wherein the at least an image component includes non-verbal content and at least an audio component, wherein the at least an audio component includes audible verbal content related to at least an attribute of the subject. The computing device is further configured to transcribe at least a keyword as a function of the at least an audio component using an automatic speech recognition process. The computing device is further configured to classify, using a machine vision process comprising a classifier, the non-verbal content to at least a feature. The computing device is further configured to associate the subject with at least a job description as a function of the at least a keyword and the at least a feature. The computing device is further configured to calculate a ranking of the subject out of a plurality of candidates, wherein the ranking is based on a description-centric ranking factor.

In another aspect, a method for parsing and correlating solicitation video content, the method including receiving, by a computing device, a solicitation video related to a subject, wherein the solicitation video includes at least an image component, wherein the at least an image component includes non-verbal content and at least an audio component, wherein the at least an audio component includes audible verbal content related to at least an attribute of the subject. The method further including transcribing, by the computing device, at least a keyword as a function of the at least an audio component using an automatic speech recognition process. The method further including classifying, by the computing device using a machine vision process comprising a classifier, the non-verbal content to at least a feature. The method further including associating, by the computing device, the subject with at least a job description as a function of the at least a keyword and the at least a feature. The method further including calculating, by the computing device, a ranking of the subject out of a plurality of candidates, wherein the ranking is based on a description-centric ranking factor.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for parsing and correlating solicitation video content. In an embodiment, a solicitation video may include a video resume.

Aspects of the present disclosure can be used to automatically analyze and sort applicants according to their video. Aspects of the present disclosure can also be used to associate applicants with relevant job descriptions. This is so, at least in part, because information request in sorting an applicant is inherently present within a video resume. However, no system presently facilitates the automatic sorting of applicants based upon their video resumes.

Aspects of the present disclosure allow for a practical improvement over the current state of the art for applicant sorting by allowing for video data to be parsed and its contents used in an automated process. Exemplary embodiments illustrating aspects of the present disclosure are described below in the context of several specific examples.

Figure 1:
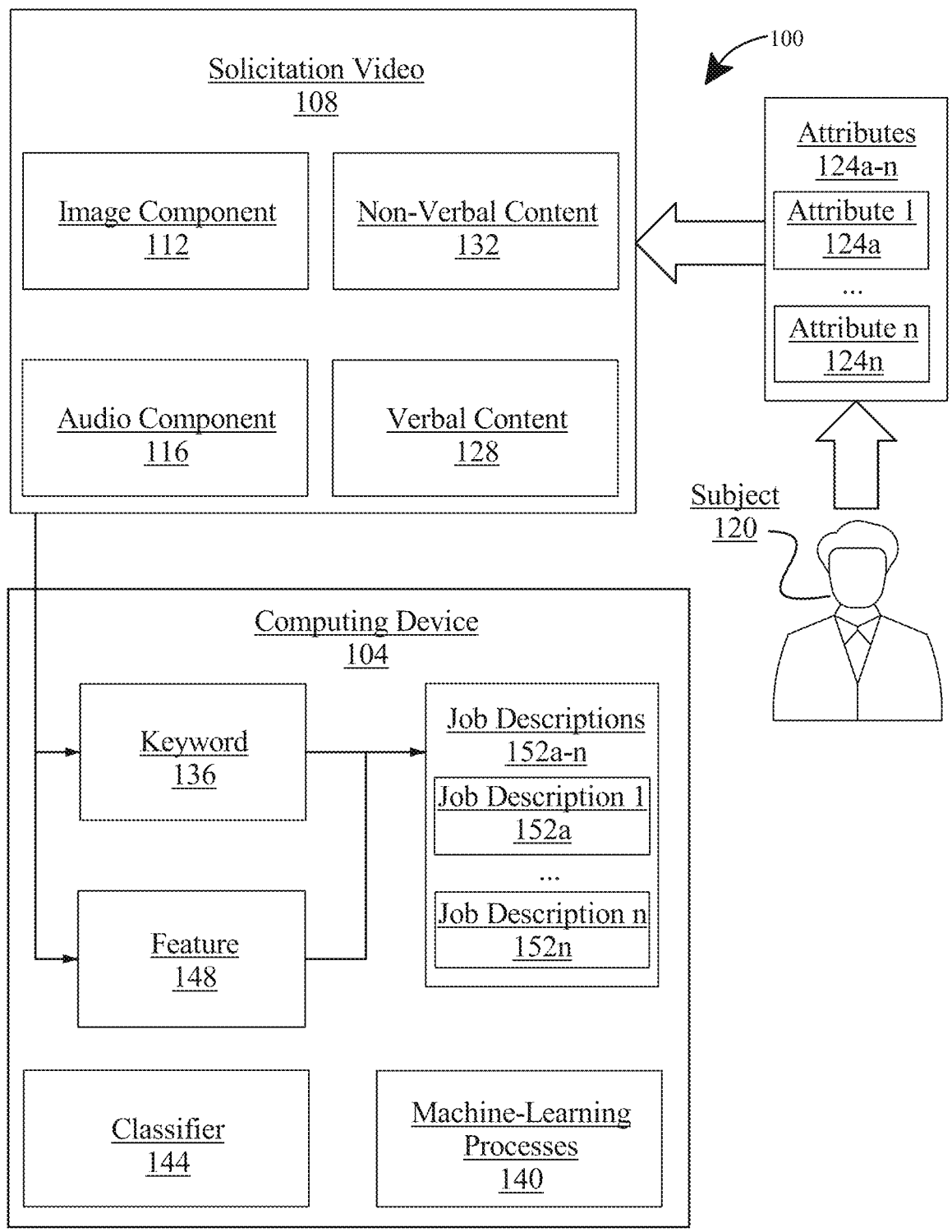
FIG. 1 is a block diagram of an exemplary system for parsing and correlating solicitation video content.

Referring now to FIG. 1, an exemplary embodiment of a system 100 for parsing and correlating solicitation video content is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may be configured to receive a solicitation video 108. As used in this disclosure, a "solicitation video" is an item of media, including both an image component 112 and an audible component 116, related to a subject 120. In some cases, solicitation video 108 may include a digital video, which may be communicated by way of digital signals, for example between computing devices which are communicatively connected with at least a network. Digital video may be compressed in order to optimize speed and/or cost of transmission of video 108. Videos may be compressed according to a video compression coding format (i.e., codec). Exemplary video compression codecs include without limitation H.26x codecs, MPEG formats, VVC, SVT-AV1, and the like. In some cases, compression of a digital video 108 may be lossy, in which some information may be lost during compression. Alternatively or additionally, in some cases, compression of a digital video 108 may be substantially lossless, where substantially no information is lost during compression.

In some cases, a solicitation video 108 may include content that is representative or communicative of at least an attribute 124a-n of a subject 120. As used in this disclosure, a "subject" is a person, for example an ostensibly competent person or jobseeker. Subject 120 may be represented directly, i.e., in person, by solicitation video 108. For example, in some cases, an image component 112 may include an image of subject 120 and/or an audible component 116 may include audio of subject 120, for instance the subject 120 speaking. Attributes 124a-n may include subjects skills, competencies, credentials, talents, and the like. In some cases, attributes 124a-n may be explicitly conveyed within solicitation video 108. Alternatively or additionally, in some cases, attributes 124a-n may be conveyed implicitly with solicitation video 108.

With continued reference to FIG. 1, solicitation video 108 includes at least an image component 112. As used in this disclosure, an "image component" is a visual representation. Image component 112 may include animations, still imagery, recorded video, and the like. Image component may include visual information of solicitation video 108. In some cases, image component 112 may include a plurality of temporally sequential frames. In some cases, each frame may be encoded (e.g., bitmap or vector-based encoding). Each frame may be configured to be displayed by way of a display. Exemplary displays include without limitation light emitting diode (LED) displays, cathode ray tube (CRT) displays, liquid crystal displays (LCDs), organic LEDs (OLDs), quantum dot displays, projectors (e.g., scanned light projectors), and the like. In some cases, image component 112 may digitally represent (i.e., encode) visual information, for instance a pixel (luma and/or chroma) mapping.

With continued reference to FIG. 1, solicitation video 108 includes at least an audio component 116. As used in this disclosure, an "audio component" is a representation of audio, for example a sound, a speech, and the like. In some cases, audio component 116 may be represented digitally. In some cases, audio component 116 may be temporally associated with image component 112. For example, in some cases, audio component 116 may be synchronized with image component 112. Audio component 116 may be compressed and/or encoded, for example by way of a digital audio coding format (i.e., codec). Exemplary audio codecs include without limitation free lossless audio codec (FLAC), MPEG-4 audio lossless coding, Dolby digital, MP3, Vorbis, and the like. In some cases, an audio codec may be lossless. Alternatively or additionally, in some cases, an audio codec may be lossy.

With continued reference to FIG. 1, solicitation video may include, for example by way of representation with one or both of image component 112 and audio component 116, verbal content 128. As used in this disclosure, "verbal content" is comprehensible language-based communication. For example, in some cases, verbal content 128 may include visual verbal content. As used in this disclosure, "visual verbal content" is literal (e.g., written) verbal content. In some cases, visual verbal content may be included within solicitation video 108 substantially by way of image component 112. Alternatively or additionally, in some cases, verbal content 128 may include audible verbal content. As used in this disclosure, "audible verbal content" is oral (e.g., spoken) verbal content. In some cases, audible verbal content may be included within solicitation video 108 substantially by way of audio component 116. In some cases, verbal content 128 may be related to at least an attribute of subject. For example, verbal content 128 may explicitly communicative at least an attribute 124a-n of subject 120.

Still referring to FIG. 1, in some embodiments, solicitation video 108 may include, for example by way of representation with one or both of image component 112 and audio component 116, non-verbal content 132. As used in this disclosure, "non-verbal content" is all communication that is not characterized as verbal content. As such, non-verbal content includes all subtle (and non-subtle) forms of communication which are not conveyed with use of language. Exemplary non-verbal content may include change in intonation and/or stress in a speakers voice, expression of emotion, interjection, and the like. For example, in some cases, non-verbal content 132 may include visual non-verbal content. As used in this disclosure, "visual non-verbal content" is non-verbal content that is visually represented. In some cases, visual non-verbal content 132 may be included within solicitation video 108 substantially by way of image component 112. Alternatively or additionally, in some cases, non-verbal content 132 may include audible non-verbal content. As used in this disclosure, "visual non-verbal content" is non-verbal content that is audibly represented. In some cases, audible non-verbal content 132 may be included in solicitation video 108 substantially by way of audio component 116. Solicitation video 108 is representative of a form of a subject-specific data. As used in this disclosure, "subject-specific data" is any element of information that is associated with a specific subject 120. Exemplary forms of subject-specific data include image component 112, audio component 116, verbal content 128, non-verbal content 132, solicitation video 108, as well as any information derived directly or indirectly from solicitation video or any other subject-specific data. In some cases, subject-specific may represent attributes 124a-n associated with a specific subject 120. In some cases, a non-verbal classifier 144 may classify non-verbal content present in one or more of audio component 116 and image component 112 to one or more of a job description 152a-n, a feature 148, and a keyword 136. Non-verbal classifier 144 may include a number of classifiers, for example each being tasked with classifying a particular attribute 124a-n or form of non-verbal content 132. For example, in some cases, non-verbal classifier 144 may classify a solicitation video 108 and related subject 120 as associated with a feature 148 or keyword 136 representative of 'personable.' Non-verbal classifier 144 may include a specialized audible non-verbal classifier to classify audible non-verbal content 132 within audio component 116 as sounding 'personable' that is, for example, as having appropriate levels of intonation, timber, melody, stress, and the like. Likewise, non-verbal classifier 144 may include another specialized visual non-verbal classifier to classify visual non-verbal content 132 as appearing 'personable' that is, for example, as having appropriate posture, facial expressions, manner of dress, and the like. In some cases, classifier 144 may include or a constituent part of tree structure, for making associations based upon solicitation video 108.

With continued reference to FIG. 1, computing device 104 may transcribe at least a keyword 136. Computing device 104 may transcribe at least a keyword as a function of one or more of image component 112 and audio component 116. Computing device 104 may transcribe at least a keyword as a function of verbal content 128. As used in this disclosure, a "keyword" is any meaningful word or syntax. In some cases, computing device 104 may transcribe much or even substantially all verbal content 128 from solicitation video 108. In some cases, computing device 104 may transcribe audible verbal content 128, for example by way of speech to text or speech recognition technologies. Exemplary automatic speech recognition technologies include, without limitation, dynamic time warping (DTW)-based speech recognition, end-to-end automatic speech recognition, hidden Markov models, neural networks, including deep feedforward and recurrent neural networks, and the like. Generally, automatic speech recognition may include any machine-learning process 140 described in this disclosure, for example with reference to FIGS. 5-8.

Still referring to FIG. 1, in some embodiments, automatic speech recognition may require training (i.e., enrollment). In some cases, training an automatic speech recognition model may require an individual speaker to read text or isolated vocabulary. In some cases, a solicitation video 108 may include an audio component 116 having an audible verbal content 128, the contents of which are known apriori by computing device 104. Computing device 104 may then train an automatic speech recognition model according to training data which includes audible verbal content 128 correlated to known content. In this way, computing device 104 may analyze a person's specific voice and train an automatic speech recognition model to the person's speech, resulting in increased accuracy. Alternatively or additionally, in some cases, computing device 104 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content 116, rather than what the speaker is saying. In some cases, computing device 104 may first recognize a speaker of verbal audio content 128 and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject 120. For example, subject 120 may speak within solicitation video 108, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum aposteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device 104 to find an optimal match between two given sequences (e.g., time series) with certain restrictions.

That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 5-8. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

With continued reference to FIG. 1, computing device 104 may recognize verbal content not only from speech (i.e., audible verbal content). For example, in some cases, audible verbal content 128 recognition may be aided in analysis of image component 112. For instance, in some cases, computing device 104 may image content 112 to aid in recognition of audible verbal content 128 as a viewing a speaker (e.g., lips) as they speak aids in comprehension of his or her speech. In some cases computing device 104 may include audiovisual speech recognition processes.

Still referring to FIG. 1, in some embodiments, audio visual speech recognition (AVSR) may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel-frequency cepstrum coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content 128. For instance, audio vector and image vector may each be concatenated and used to predict speech made by a subject 120, who is 'on camera.'

With continued reference to FIG. 1, in some embodiments, image component 112 may include or otherwise represent verbal content 128. For instance, written or visual verbal content 128 may be included within image component 112. In some cases, computing device 104 may be configured to recognize at least a keyword 136 as a function of visual verbal content 128. In some cases, recognizing at least a keyword 136 may include optical character recognition.

Still refereeing to FIG. 1, in some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes 140. In some cases, intelligent word recognition (IWR) may recognize written text, one word at a time, for instance by employing machine-learning processes 140.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component 112. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component 112 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component 112.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component 112. Matrix matching may also rely on a stored glyph being in a similar font and at a same scale as input glyph. Matrix matching may work best with typewritten text.

Still referring to FIG. 1, in some embodiments, an OCR process may include a feature extraction process. As used in this disclosure, a "feature" is an individual measurable property or characteristic. In some cases, feature extraction may decompose a glyph into at least a feature 148. Exemplary non-limiting features 148 may include corners, edges, lines, closed loops, line direction, line intersections, and the like. In some cases, feature extraction may reduce dimensionality of representation and may make the recognition process computationally more efficient. In some cases, extracted feature 148 can be compared with an abstract vector-like representation of a character, which might reduce to one or more glyph prototypes. General techniques of feature detection in computer vision are applicable to this type of OCR. In some embodiments, machine-learning process 140 like nearest neighbor classifiers 144 (e.g., k-nearest neighbors algorithm) can be used to compare image features 148 with stored glyph features and choose a nearest match. OCR may employ any machine-learning process 140 described in this disclosure, for example machine-learning processes 140 described with reference to FIGS. 5-8. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components 112 where visual verbal content 128 may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 5-8.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content 128. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of apriori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, computing device 104 may extract or otherwise recognize at least a feature 148. Feature 148 may be recognized and/or extracted from image component 112 and/or audio component 116 of solicitation video 108. In some cases, features 148 may be recognized, which are associated with non-verbal content 132. For example, in some cases, visual non-verbal content 132 such as expression of a subject's emotion may be represented by a number of features 148 which are readily extracted from image component 112 of solicitation video 108. In some cases, recognition and/or extraction of features from image component may include use of machine vision techniques.

Still referring to FIG. 1, in some embodiments, system 100 may include a machine vision process. A machine vision process may use image component 112 from solicitation video 108, to make a determination about verbal 128 and/or non-verbal content 132. For example, in some cases a machine vision process may be used for world modeling or registration of objects within a space. In some cases, registration and/or feature 148 recognition may include image processing, such as without limitation object recognition, feature detection, edge/corner detection, and the like. Non-limiting example of feature 148 detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

Still referring to FIG. 1, in some cases, machine vision process may perform pose-estimation for example to ascertain a relative location or movement of objects within solicitation video 108. include one or more transformations, for example to a view of a frame (or an image or solicitation video 108) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; image recognition and/or edge detection software may be used to detect a multiple views of images of an object (from subsequent frames) to derive a relative position along a third (z) axis. In some cases, solicitation video 108 may include a stereo image, having two stereoscopic views, which may be compared to derive z-axis values of points on object permitting, for instance, derivation of further z-axis points within and/or around the object using interpolation. Alternatively or additionally, relative movement within image component 112 (e.g., frame to frame) may be used to ascertain positions of objects, even along a z-axis, for instance by way of kinetic parallax. In some cases, relative motion of objects further away may occur at a different speed than objects nearby, this phenomenon may be used to ascertain a position of objects relative a camera, for example when the camera is moving. Object recognition and pose estimation may be repeated with multiple objects in field of view, including without a subject 120. In an embodiment, x and y axes may be chosen to span a plane common to a field of view of a camera used for solicitation video 108 image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

Still referring to FIG. 1, in some cases, a machine vision process may use a classifier 144, such as any classifier 144 described throughout this disclosure, for example with reference to FIGS. 5-8. Feature 148 recognition may include any feature recognition processes described in this disclosure. In some cases, features 148 may be representative of at least an attribute 124a-n of a subject 120. Attributes 124a-n which may be ascertained from features 148 include manner of dress, environment around subject 120, facial expression of subject 120, tone of voice of subject 120, and the like. Recognition and/or extraction of features 140 may include pre- and/or post-procession. Pre- and/or post-processing may include any pre-processing and/or post-processing processes described in this disclosure. In some cases, classifier 144 may classify one or more of non-verbal content 132, image component 112, audio component 116, and at least a feature 148 to a keyword 136.

Still referring to FIG. 1, keywords 136 and/or features 148, in some cases, are forms of subject-specific data, that is they represent information associated with an individual subject 120, for example attributes 124a-n. In some cases, subject-specific data, such as without limitation video 108, image component 112, audio component 116, keywords 136, and/or features 148 may be represented and/or processed as a signal. As used in this disclosure, a "signal" is any intelligible representation of data, for example used to convey data from one device to another. A signal may include an optical signal, a hydraulic signal, a pneumatic signal, a mechanical, signal, an electric signal, a digital signal, an analog signal and the like. In some cases, a signal may be used to communicate with a computing device 104, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, system 100 may perform one or more signal processing steps on a signal. For instance, system 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), wavelet transform, finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, computing device 104 associate a subject 120 with at least a job description 152a-n. As used in this disclosure, a "job description" is representation of function; a person may be required to perform, oversee, or be involved with the function. In some cases, a job description may include a number of fields, for example a unique identifier, a title, required attributes, desired attributes, explanation of role, explanation of benefits, location of job, organization (e.g., company) associated with the job description, and the like. In some cases, at least a job description 152a-n may be represented by description-specific data. As used in this disclosure, "description-specific data" is information associated with a specific job description. In some cases, description-specific data may include information job description as well as any information derived directly or indirectly from the job description. In some cases, description-specific data may be generated through analysis and/or pre-processing of a job description.

With continued reference to FIG. 1, computing device 104 may associate subject 120 with at least a job description 152a-n, for example as a function of subject-specific data (e.g., one or more of at least a keyword 136 and at least a feature 148). In some cases, associating a subject 120 with at least a job description 152a-n may include use of subject-specific data and description-specific data. For example, in some cases, associating a subject 120 with at least a job description 152a-n may include a text retrieval process comparing subject-specific data with description-specific data. Document retrieval may include matching of some query against a set of records, for instance text-based records. In some cases, records could be any type of structured or unstructured text, such as job descriptions 152a-n. In some cases, document retrieval may be referred to as, or as a branch of, text retrieval. "Text retrieval," as used in this disclosure, is information retrieval where the information has a text component.

Still referring to FIG. 1, in some cases, computing device 104 associate a subject 120 with at least a job description 152a-n by performing a text retrieval process as a function of at least a keyword 136. For example, in some cases, computing device 104 may query at least a job description 152a-n for presence of at least a keyword 152a-n. Querying at least a job description 152a-n may include one or more of word searching, phrase searching, proximity searching, full-text searching, field (or metadata) searching, and the like. In some cases, each job description 152a-n may include at least a job description keyword. As used in this disclosure, a "job description keyword" is a word that is of particular relevance to an individual job description. In some cases, associating a subject 120 with at least a job description 152a-n may include comparing at least a keyword 136 from solicitation video 108 with at least a job description keyword.

With continued reference to FIG. 1, in some embodiments, associating querying at least a job description 152a-n may be performed with a test search, for example using at least a keyword 136 as a search term. Text search may include techniques for searching a single computer-stored document or a collection of documents, for example in a database. Text search may include full-text search. Full-text search may be distinguished from searches based on metadata or on field-based searching (e.g., fields such as titles, abstracts, selected sections, or bibliographical references).

In an exemplary full-text search, computing device 104 may examine all words in every stored document 152a-n as it tries to match search criteria (for example, keywords 136). Alternatively, a text search may be limited to fields, such as with field-based searching.

Still referring to FIG. 1, in some embodiments, text searching may include querying. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In some cases, querying of at least a job description 152a-n may include any number of querying tools, including without limitation keywords (as described above), field-restricted search, Boolean queries, phrase search, concept search, concordance search, proximity search, regular expression, fuzzy search, wildcard search, and the like. In some cases, keywords 136 may be used to perform a query. In some cases, a document 152a-n creator (or trained indexers) may supply a list of words that describe subject of the document, including without limitation synonyms of words that describe the subject. In some cases, keywords may improve recall, for instance if the keyword list includes a keyword that is not in text of a document 152a-n. In some cases, querying tools may include field-restricted search. A field-restricted search may allow a queries scope to be limited to within a particular field within a stored data record, such as "Title" or "Author." In some cases, a query tool may include Boolean queries. Searches that use Boolean operators (for example, "encyclopedia" AND "online" NOT "Encarta") can dramatically increase precision of a search. In some cases, an AND operator may say, in effect, "Do not retrieve any document unless it contains both of these terms." In some cases, a NOT operator may say, in effect, "Do not retrieve any document that contains this word." In some cases, a retrieval list retrieving too few documents, may prompt and OR operator to be used in place of an AND operator to increase recall; consider, for example, "encyclopedia" AND "online" OR "Internet" NOT "Encarta". This search will retrieve documents about online encyclopedias that use the term "Internet" instead of "online." In some cases, search precision and recall are interdependent and negatively correlated in text searching. In some cases, a query tool may include phrase search. In some cases, a phrase search may match only those documents that contain a specified phrase. In some cases, a query tool may include a concept search. In some cases, a concept search may be based on multi-word concepts, for example compound term processing. In some cases, a query tool may include a concordance search. In some cases, a concordance search may produce an alphabetical list of all principal words that occur in a text and may include their immediate context. In some cases, a query tool may include a proximity search. In some cases, a proximity search matches only those documents that contain two or more words that are separated by a specified number of words, are in the same sentence, or an in the same paragraph. A query tool may include a regular expression. In some cases, a regular expression may employ a complex but powerful querying syntax that can be used to specify retrieval conditions with precision, for instance database syntax. A query tool may include a fuzzy search. In some cases, a fuzzy search may search for a document that matches given terms while allowing for some variation around them. In some cases, a query tool may include a wildcard search. In some cases, a wildcard search may substitute one or more characters in a search query for a wildcard character such as an asterisk. For example, using a wildcard, such as an asterisk, in a search query "s*n" will search for terms inclusive of "sin," "son," "sun," and the like.

Still referring to FIG. 1, in some cases association of a subject 120 with at least a job description may include one or more of a machine-learning process 140 and/or a classifier 144. Machine-learning process 140 may include any machine-learning process described in this disclosure, for example with reference to FIGS. 5-8. Classifier may include any classifier described in this disclosure, for example with reference to FIGS. 5-8. In some cases, computing device 104 may associate a subject 120 with at least a job description 152a-n as a function of at least a feature 148. As described above, at least a feature 148 may represent non-verbal content 132 from solicitation video 108. At least a feature 108 may be correlated to at least a job description 152a-n, for example by way of one or more models (e.g., machine-learning models). In some cases, computing device 104 associate a subject 120 with at least a job description 152a-n by correlating, matching, or otherwise comparing subject-specific data with description-specific data. In some cases, one or both of subject-specific data and description-specific data may be at least partially represented by features which are inputs and/or outputs of machine-learning processes 140. For example, a machine-learning model 140 may be trained with deterministic or historical subject-specific data correlated to description-specific data. For example, job descriptions (previously filled) may be correlated with subject-specific data associated with employees who filled the job description, and optionally a measure of their success in the role (e.g., years in position, reason for leaving, and the like).

Still referring to FIG. 1, in some embodiments, associating subject 120 with at least a job description 152a-n may additionally include classifying, using at least a candidate classifier, the subject 120 to the at least a job description 152a-n. As used in this disclosure, a "candidate classifier" is a classifier that classifies subjects 120 to job descriptions 152a-n or vice versa. Candidate classifier may include any classifier described in this disclosure, including with reference to FIGS. 5-8. In some cases, candidate classifier may include a trained machine-learning model, which is trained using candidate training data. As used in this disclosure, "candidate training data" is a training data that correlates one or more of subjects 120, subject-specific data, and subject attributes 124a-n to one or more of job descriptions 152a-n, description-specific data, and job description data. As used in this disclosure, a "job description datum" is an element of information associated with a job description. In some cases, candidate training data may include deterministic and/or historical data. For example, candidate training data may include subject-specific data for a number of subjects who successfully fill positions correlated with description-specific data related to job descriptions for the successfully filled positions. In some cases, a measure of success may be quantitative, for example number of years working in a position, advancement from position, positive compensation changes (e.g., raises), and the like. Alternatively or additionally, in some cases, a measure of success may be qualitative, for example a survey from a supervisor, a self-assessment and the like.

Still referring to FIG. 1, in some embodiments, computing device 104 may be further configured to determine a relevance as a function of association between a subject 120 and at least a job description 152a-n. As used in this disclosure, "relevance" is a measure of closeness of association, for example between a subject 120 and a job description 152a. In some cases, relevance may be determined by one or more processes for associating a subject 120 with a job description 152a. For example, in some cases, candidate classifier 144 may output a confidence metric that is indicate of confidence associated with a classification of a subject 120 to a job description 152a. In some cases, confidence metric may be a measure of relevance. In some cases relevance may be a quantified metric, for example in arbitrary units or relative units (e.g., percent). In some cases, candidate classifier 144 may use a distance-based classification algorithm (e.g., k nearest neighbor, vector similarity, and the like). Where a distance-based classification algorithm is used, distance may be used directly or indirectly as a confidence metric.

Figure 2:
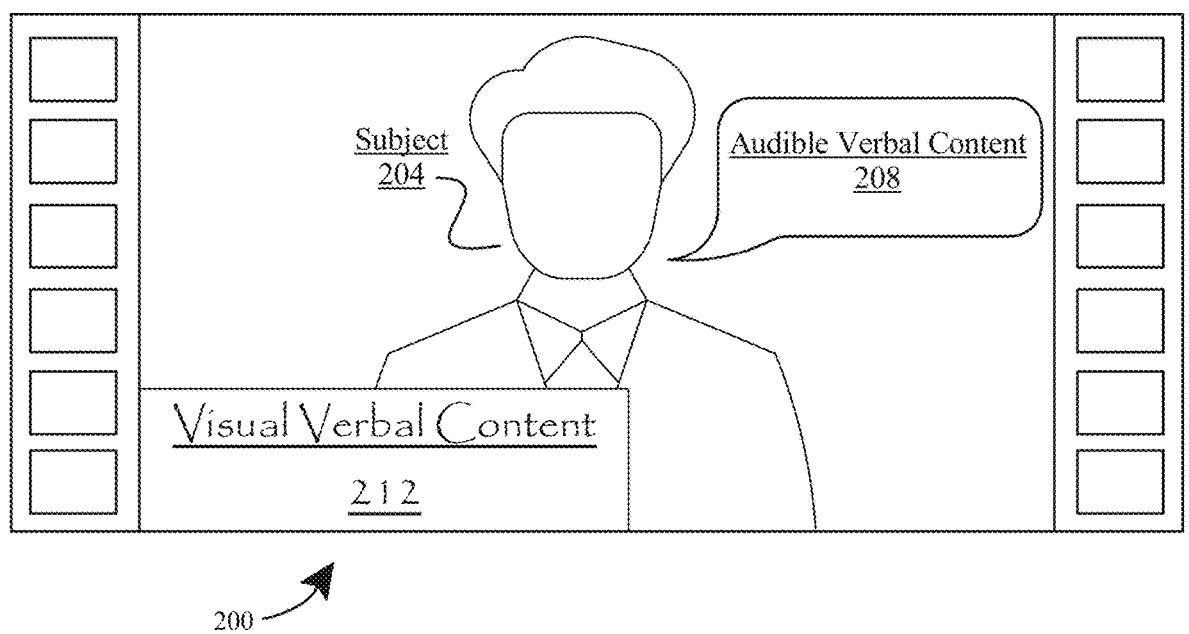
FIG. 2 illustrates an exemplary video frame.

Referring now to FIG. 2, an exemplary frame of a solicitation video 108 is illustrated. Frame may include at least a portion of an image component 112 and/or be associated with at least a portion of an audio component 116. In some cases, a solicitation video 108 may include many frames 200, for instance at a frame rate (e.g., 24, 30, 60, or 120 frames per second), thereby facilitating video.

With continued reference to FIG. 2, frame 200 may include an image of subject 204. Alternatively or additionally, in some cases solicitation video 108 may include images of other people or no person at all. An image of subject 200 may be included in solicitation video. Likewise audio of subject 204, for instance speaking, may be included in solicitation video. Audio of subject 204 speaking may include audible verbal content 208. Audible verbal content 208 may include any intelligible language-based communication transmissible audibly. Exemplary forms of audible verbal communication 208 include without limitation speech, singing, chanting, yelling, audible signals (e.g., Morse code), and the like. Audible verbal content 208 may be transcribed from solicitation video 108 and used for associating subject with at least a job description, as described above.

With continued reference to FIG. 2, in some cases, a frame 200 may include visual verbal content 212. As shown in FIG. 2, visual verbal content 212 may include images of written text represented by image component 112. Exemplary forms of visual verbal content include without limitation, digitally generated graphics, images of written text (e.g., typewritten, handwritten, and the like), signage, and the like.

Still referring to FIG. 2, in some embodiments, solicitation video may include a video resume and subject 204 may include a jobseeker. For example, it has long been said that "a picture is worth a thousand words." As film-making technology has become ubiquitous, many people, including younger generations of people, are finding video communication practical and even preferred. Present trends in social media have made this clear. For example, Facebook's popularity with younger generations was largely supplanted by Instagram, which focuses on sharing photos. And at tine of writing, Instagram's popularity among younger generations appears irreparably affected by TikTok, which focuses on sharing video.

Still referring to FIG. 2, as more potential employees become more literate with video communication, video communication within a work environment may gain in popularity. Sharing one's accomplishments and advertising one's services represents an important application of communication for an individual jobseeker. As jobseekers gain in ability and confidence in video communication, they will choose to put their best foot forward using the medium they believe best facilitates advantageous communication. As a result, some embodiments of the present disclosure inventively anticipate that video resumes will gain in popularity and address an unmet need associated with video resumes. Presently, employers are able to screen many written resumes automatically. However, this technology cannot be used with video resumes. In some case, embodiments described herein improve upon present resume screening systems by allowing the automatic parsing and correlating of video resumes.

Figure 3:
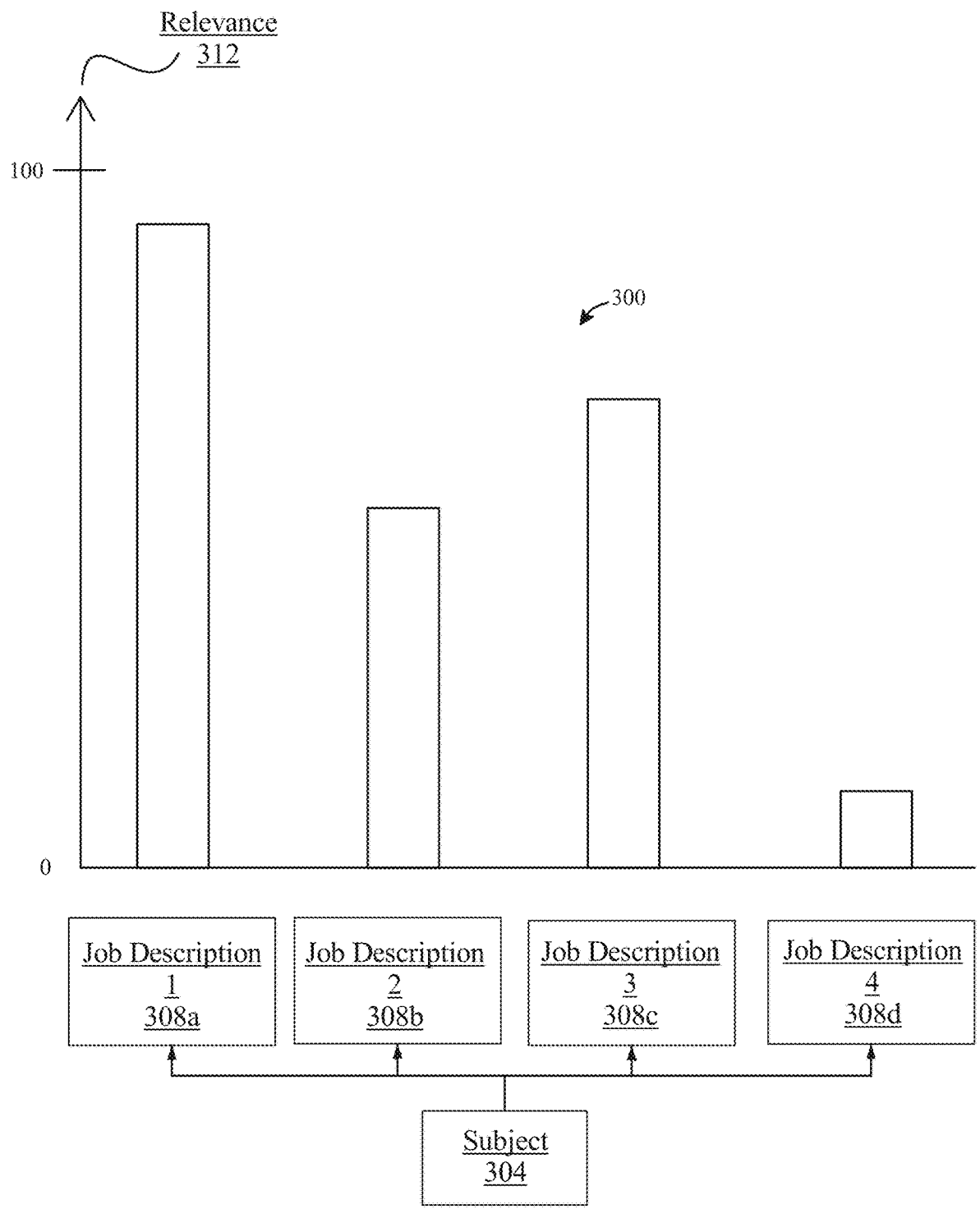
FIG. 3 is a graph depicting an exemplary association between a subject and job descriptions.

Referring now to FIG. 3, a graph 300 depicts an association between a subject 304 and a number of job descriptions 308a-d. Graph 300 illustrates a single subject 304 being associated with a plurality of job descriptions 308a-d, although the inverse relationship may also be considered, for example as described in reference to FIG. 4. In some cases, system 100 may permit a subject-centric perspective, in which a single subject is considered. In some cases, a subject-centric perspective may be useful in serving a subject 304 who is actively looking for a job. In some cases, a subject-centric perspective may allow a subject 304 to consider a plurality of job descriptions 308a-n.

With continued reference to FIG. 3, graph 300 may have a vertical axis 312 disposed to aid in graphical representation of a factor related to association between subject 304 and a job description 308a-d. In some cases, factor may include a subject-centric factor. Factor may include any number of considerations related to association between subject 304 and a job description 308a-d. Exemplary non-limiting considerations include compensation considerations, benefits considerations, professional growth-related considerations, work-life balance considerations, role considerations, title considerations, reputation considerations, location considerations, fit considerations and the like. In some cases, a factor may include relevance of association between a subject 304 and a job description 308a-d. Relevance may be applied to any particular factor, or a general relevance may be considered. In some cases, relevance may be represented on a 0-100 relative scale, for example on vertical axis 312.

Figure 4:
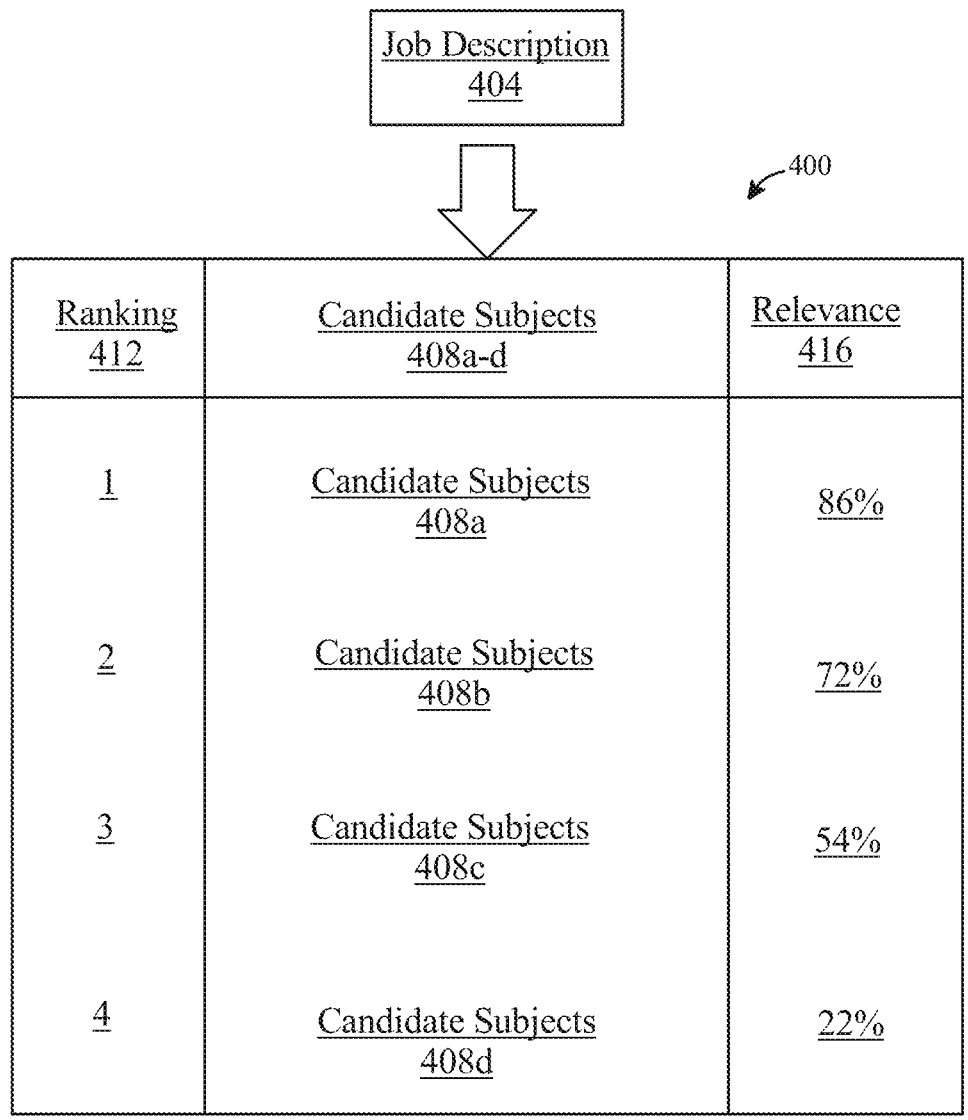
FIG. 4 is a table representing an exemplary association between multiple candidate subjects and a job description.

Referring now to FIG. 4, a table 400 is depicted that illustrates an association between a job description 404 and a plurality of candidates 408a-d. Table 400 illustrates a single job description 404 being associated with a plurality of candidates 408a-d, although the inverse relationship may also be considered, for example as described in reference to FIG. 3. In some cases, system 100 may permit a description-centric perspective, in which a single job description is considered. In some cases, a description-centric perspective may be useful in serving an employer with an open job who is actively seeking a new hire. In some cases, a description-centric perspective may allow an employer to consider a plurality of candidates 408a-n.

With continued reference to FIG. 4, table may include a number of columns, for example a ranking 412 column, a candidate 408a-d column, and a factor (e.g., relevance) 416 column. Ranking 412 may include a ranking of candidates 408a-d, for example from a best candidate 408a to a worst candidate 408d. In some cases, ranking may be based upon a factor, for example a description-centric factor. Factor may include any number of considerations related to association between candidates 408a-d and a job description 404. Exemplary non-limiting considerations include talent consideration, skills considerations, experience considerations, popularity considerations, networking consideration, compensation considerations, benefits considerations, reputation considerations, location considerations, fit considerations and the like. In some cases, a factor may include relevance 416 of association between a job description 404 and a candidate 408a-d. Relevance 416 may be applied to any particular factor or a general relevance 416 may be considered. In some cases, relevance 416 may be represented on a 0-100 relative scale, for example within a relevance 416 column.

Figure 5:
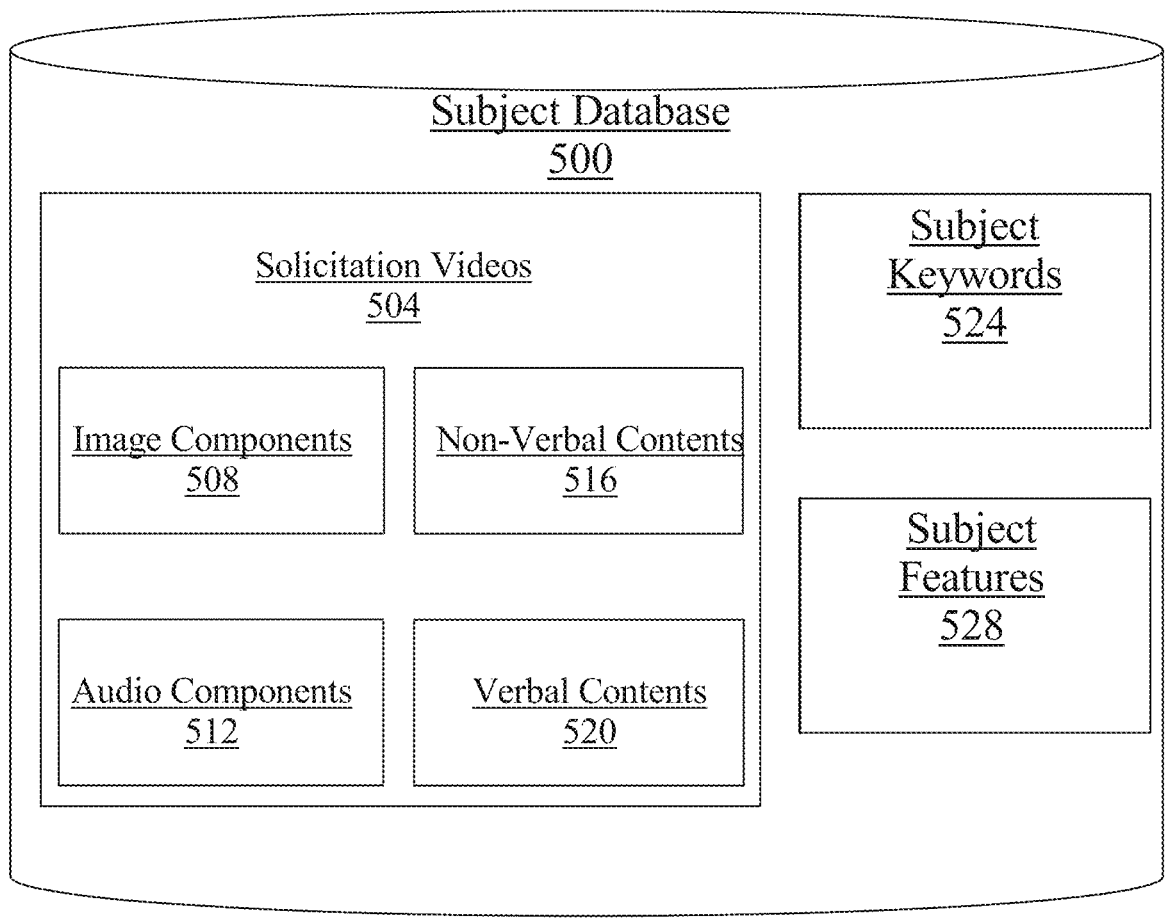
FIG. 5 illustrates an exemplary subject database using a block diagram.

Referring now to FIG. 5, an exemplary subject database 500 is illustrated by way of a block diagram. Computing device 104 may be communicatively connected with subject database 500. For example, in some cases, subject database 500 may be local to computing device 104. Alternatively or additionally, in some cases, subject database 500 may be remote to computing device 104 and communicative with computing device 104 by way of one or more networks. As used in this disclosure, "subject database" is a data structure configured to store data associated with a plurality of subjects 120. In some case, data within subject database 500 may be labeled to indicate which subject is associated with the data, for instance with a unique subject identification number. Subject database 500 may store a plurality of solicitation videos 504. Solicitation videos 504 may be uploaded to subject database from at least a remote device. Remote device may include any computing device described in this disclosure, for example with reference to FIG. 13 below. As described above with reference to FIG. 1, solicitation videos 504 may include image components 508, audio components 512, non-verbal contents 516, and/or verbal contents 520. Additionally, subject database 500 may include subject keywords 500. As described above, subject keywords 524 may be include words that were represented verbally within a solicitation video 504. Alternatively or additionally, subject keywords 524 may be associated and/or classified to a subject 120 from non-verbal content or through user entry. Subject database 500 may additionally store subject features 528 associated with subjects. As described above, subject features may be recognized or extracted from solicitation videos 504 associated with a subject by way of a number of processes described in detail in this disclosure.

Figure 6:
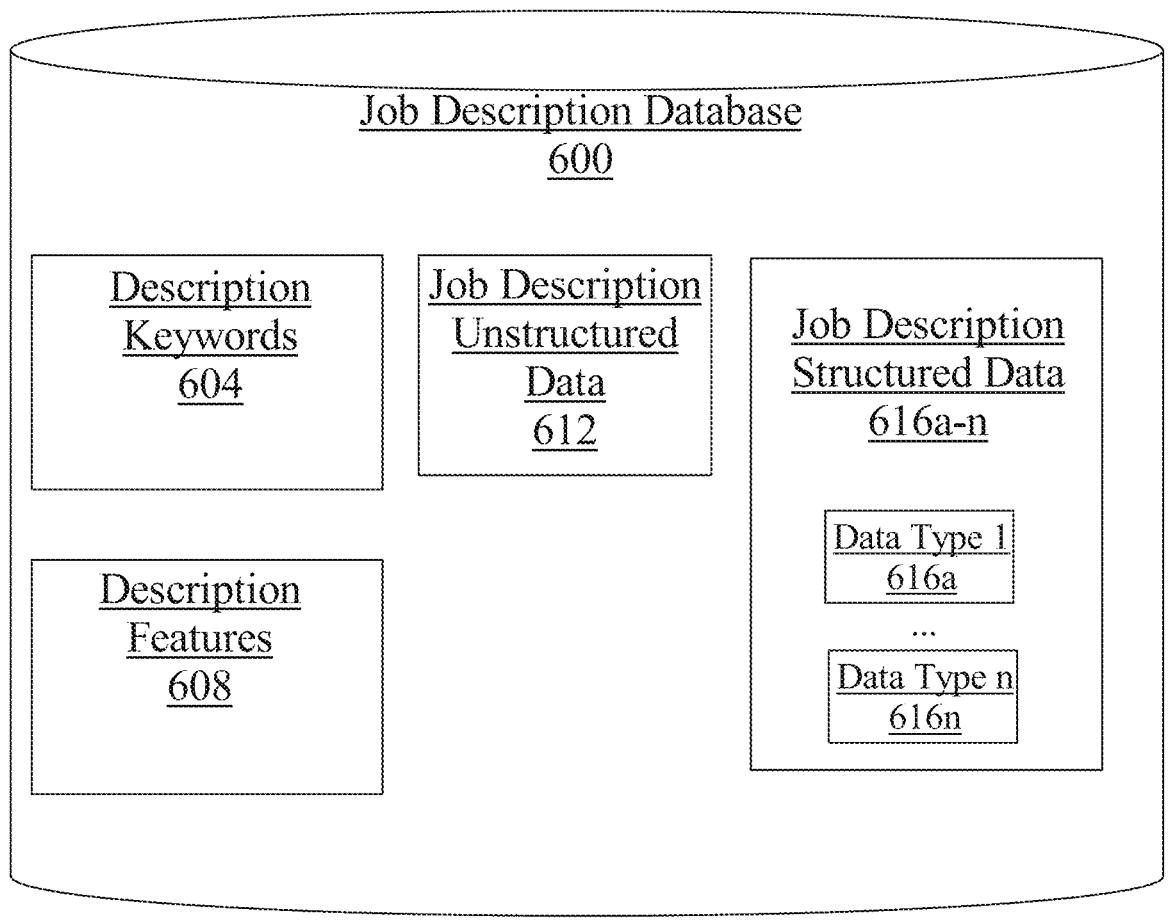
FIG. 6 is a block diagram illustrating an exemplary job description database.

Referring now to FIG. 6, an exemplary job description database 600 is illustrated by way of a block diagram. Computing device 104 may be communicatively connected with job description database 600. For example, in some cases, job description database 600 may be local to computing device 104. Alternatively or additionally, in some cases, job description database 600 may be remote to computing device 104 and communicative with computing device 104 by way of one or more networks. As used in this disclosure, "job description database" is a data structure configured to store data associated with a plurality of job descriptions 152a-n. In some case, data within job description database 600 may be labeled to indicate which job description is associated with the data, for instance with a unique job description identification number. Job description database 600 may store a plurality of description keywords 604. As described above, job description keywords may include descriptive words associated with a job description, and thereby facilitate precise association between job descriptions and subjects having similar keywords. Likewise, job description database 600 may store description features 608. Description features 608 may include features associated with a job description and may be used to associate and/or classify a subject with a job description, for example by way of one or more models. In some cases, Job description database 600 may include job description unstructured data 612. Job description unstructured data 612 may include text or other data which may be searched or otherwise associated with a subject. In some cases, job description database 600 may include job description structured data 616a-n. Job description structured data 616a-n may include any data associated with a job description having a particular type, for example data with fields, such as without limitation 'title,' 'role,' 'required years of experience,' 'salary,' and the like. In some cases, job description structured data 616a-n may include a table with different fields for different data types 616a-n.

Figure 7:
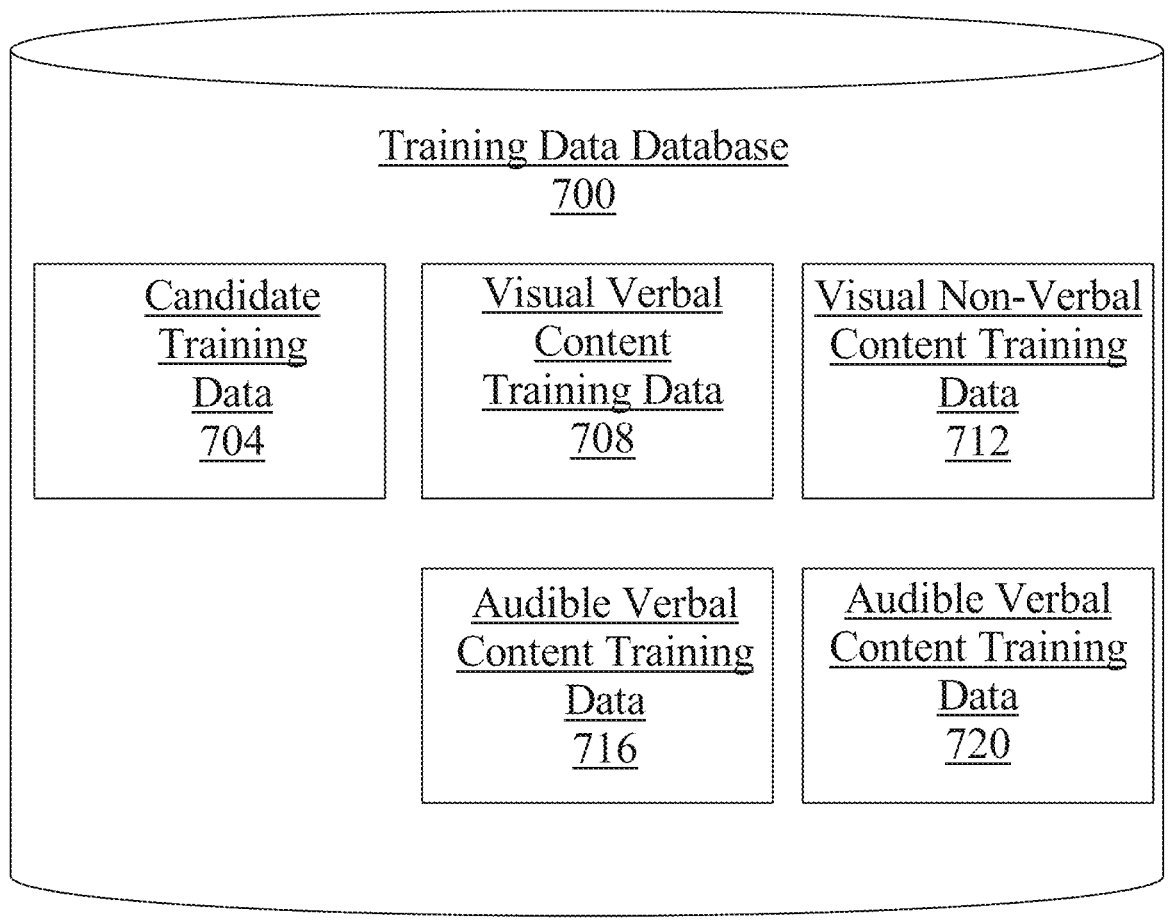
FIG. 7 illustrates by way of a block diagram an exemplary training data database.

Referring now to FIG. 7, a training data database 700 is illustrated by way of a block diagram. Computing device 104 may be communicatively connected with job description database 700. For example, in some cases, training data database 700 may be local to computing device 104. Alternatively or additionally, in some cases, training data database 700 may be remote to computing device 104 and communicative with computing device 104 by way of one or more networks. As used in this disclosure, "training data database" is a data structure configured to store training data. As described in this disclosure, many embodiments may use training data to perform any number of processes. Training data may, in some cases, need to be used, re-used, modified, deleted, and the like. In some cases, training data may need to be conditionally selected. Training data database 700 may include candidate training data 704. As described above, candidate training data 704 may correlated subject-specific data with description-specific data. Candidate training data 704 may therefore be used to aid with processes that associate or classify a subject and a job description. Additionally, training data sets may be stored in training data database 700. For example, in some cases, training data that may be used to extract data (e.g., keywords and/or features), for example from solicitation videos 108 may be stored in training data database 700; these training sets may include without limitation visual verbal content training data 708, visual non-verbal content training data 712, audible verbal content training data 716, and audible verbal content training data 720.

Referring to FIGS. 5-7, data stored within databases may be organized according to tables. For example tables with fields and labels. Tables within databases 500, 600, and 700 may be organized in various ways consistent with this disclosure.

Figure 8:
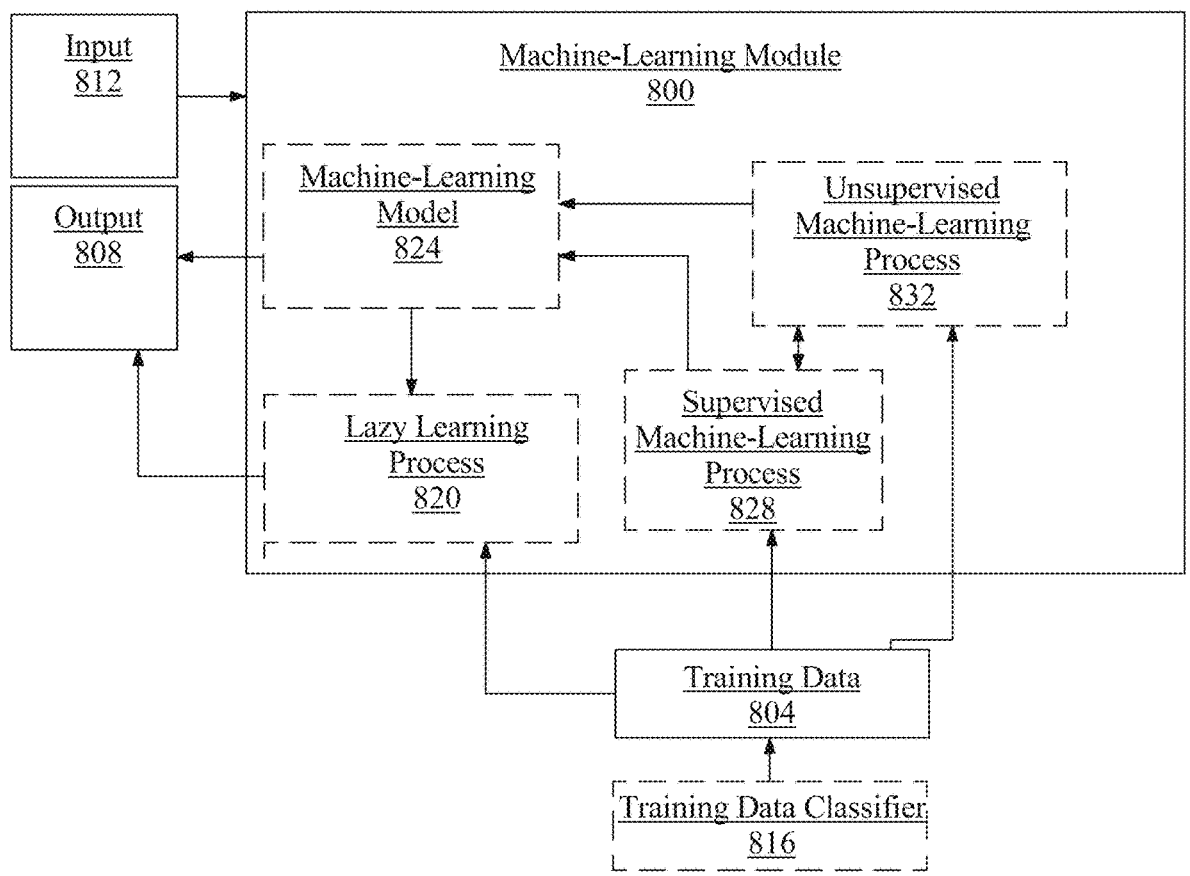
FIG. 8 is a block diagram of exemplary machine-learning processes.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure. As a non-limiting illustrative inputs may include subject-specific data and outputs may include description-specific data.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 816 may classify elements of training data to according to fields of job description for instance, title, role, organization, requisite experience, requisite credentials, and the like.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include subject-specific data as described above as inputs, description-specific data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 9:
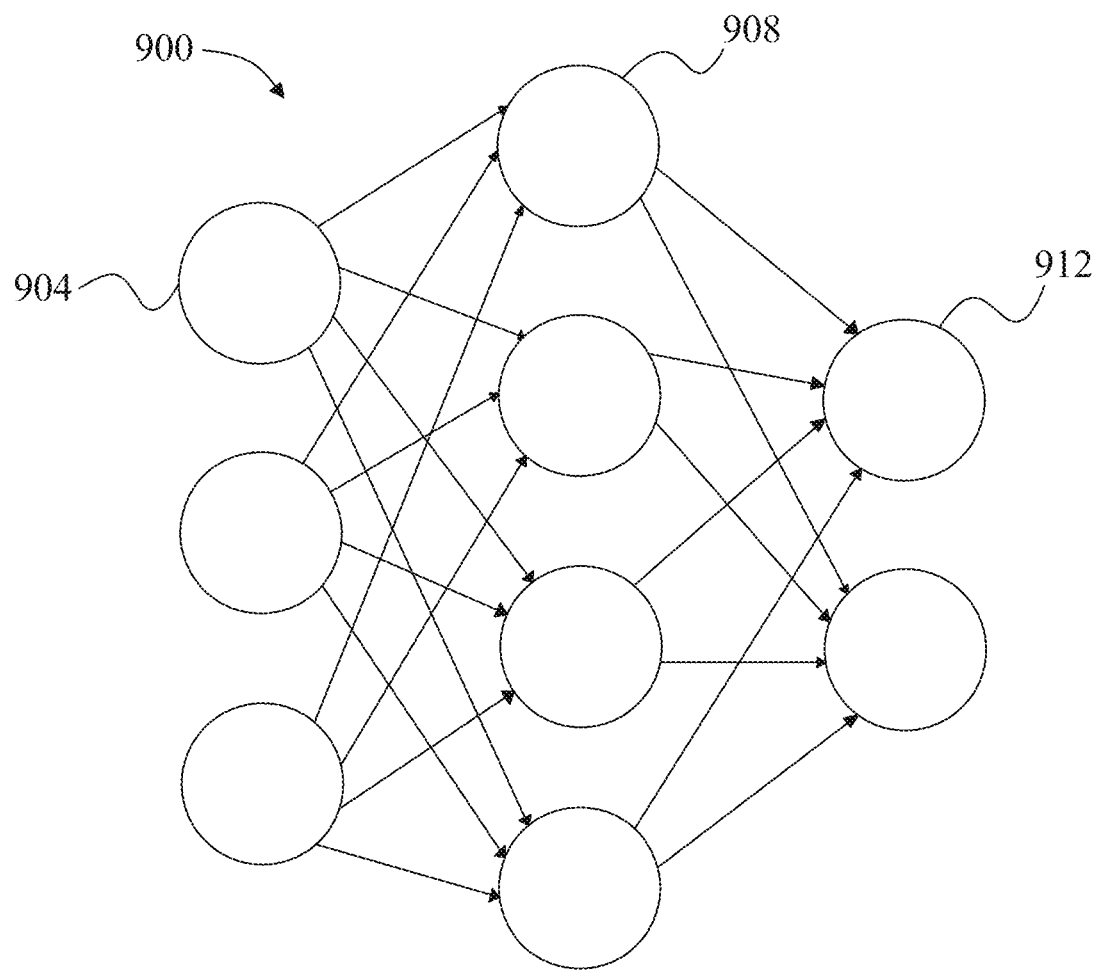
FIG. 9 illustrates an exemplary nodal network.

Referring now to FIG. 9, an exemplary embodiment of neural network 900 is illustrated. A neural network 900 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 10:
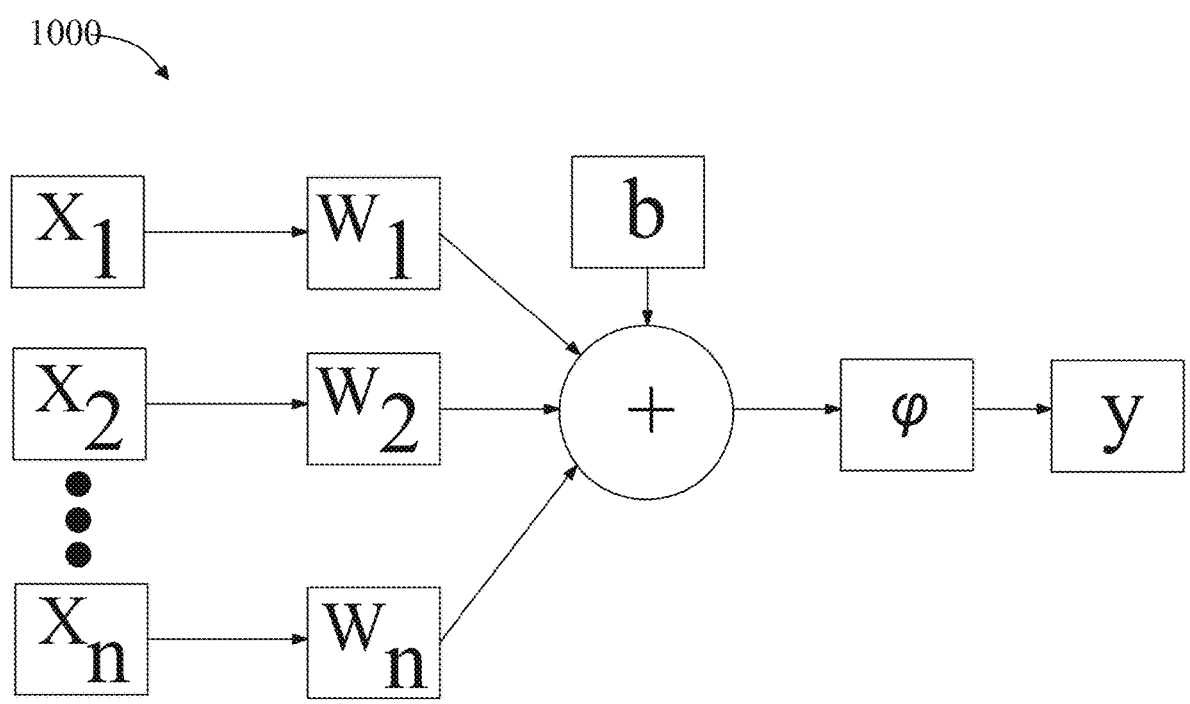
FIG. 10 is a block diagram of an exemplary node.

Referring now to FIG. 10, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 11:
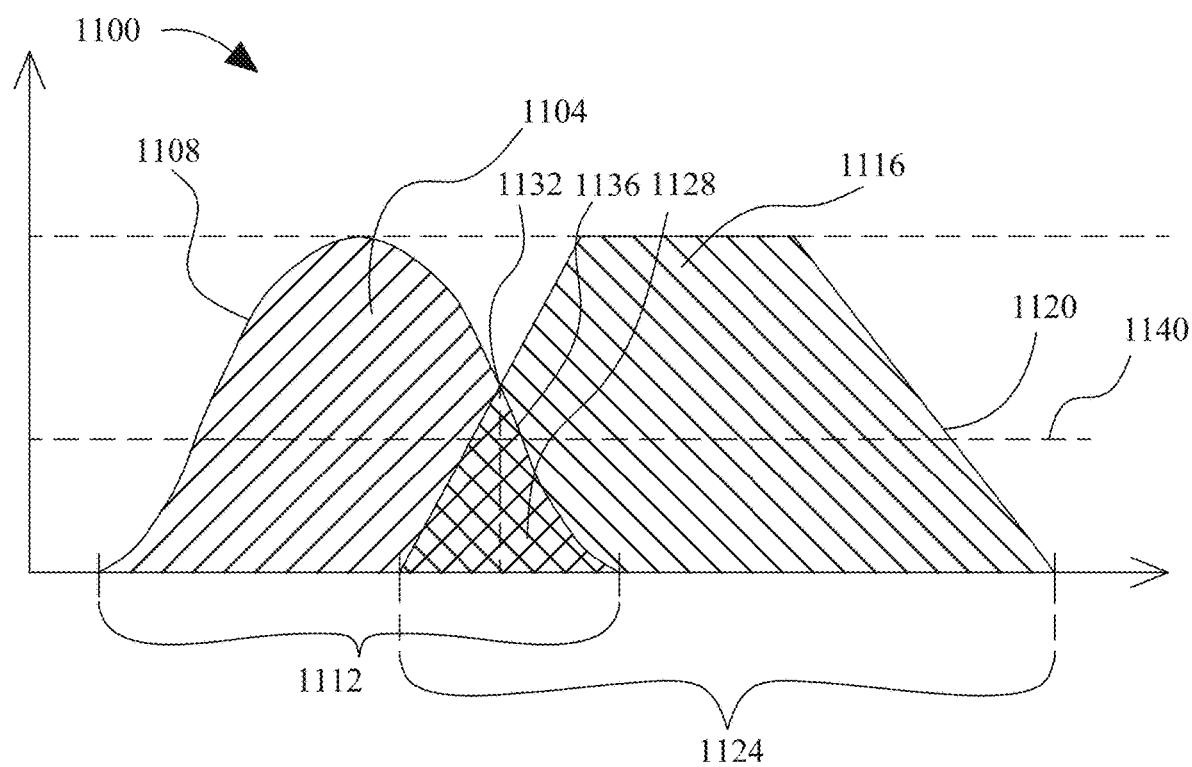
FIG. 11 is a graph illustrating an exemplary relationship between fuzzy sets.

Referring to FIG. 11, an exemplary embodiment of fuzzy set comparison 1100 is illustrated. A first fuzzy set 1104 may be represented, without limitation, according to a first membership function 1108 representing a probability that an input falling on a first range of values 1112 is a member of the first fuzzy set 1104, where the first membership function 1108 has values on a range of probabilities such as without limitation the interval [0,1], and an area beneath the first membership function 1108 may represent a set of values within first fuzzy set 1104. Although first range of values 1112 is illustrated for clarity in this exemplary depiction as a range on a single number line or axis, first range of values 1112 may be defined on two or more dimensions, representing, for instance, a Cartesian product between a plurality of ranges, curves, axes, spaces, dimensions, or the like. First membership function 1108 may include any suitable function mapping first range 1112 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 11, first fuzzy set 1104 may represent any value or combination of values as described above, including output from one or more processes (e.g., machine-learning models), subject-specific data (e.g., keywords 136 and/or features 148), and description-specific data. A second fuzzy set 1116, which may represent any value which may be represented by first fuzzy set 1104, may be defined by a second membership function 1120 on a second range 1124; second range 1124 may be identical and/or overlap with first range 1112 and/or may be combined with first range via Cartesian product or the like to generate a mapping permitting evaluation overlap of first fuzzy set 1104 and second fuzzy set 1116. Where first fuzzy set 1104 and second fuzzy set 1116 have a region 1128 that overlaps, first membership function 1108 and second membership function 1120 may intersect at a point 1132 representing a probability, as defined on probability interval, of a match between first fuzzy set 1104 and second fuzzy set 1116. Alternatively or additionally, a single value of first and/or second fuzzy set may be located at a locus 1136 on first range 1112 and/or second range 1124, where a probability of membership may be taken by evaluation of first membership function 1108 and/or second membership function 1120 at that range point. A probability at 1128 and/or 1132 may be compared to a threshold 1140 to determine whether a positive match is indicated. Threshold 1140 may, in a non-limiting example, represent a degree of match between first fuzzy set 1104 and second fuzzy set 1116, and/or single values therein with each other or with either set, which is sufficient for purposes of the matching process; for instance, threshold may indicate a sufficient degree of overlap between an output from one or more machine-learning models and/or subject-specific data and a predetermined class, such as without limitation a job description, for combination to occur as described above. Alternatively or additionally, each threshold may be tuned by a machine-learning and/or statistical process, for instance and without limitation as described in further detail below.

Further referring to FIG. 11, in an embodiment, a degree of match between fuzzy sets may be used to classify a subject 120 with at least a job description 152a-n. For instance, if subject-specific data has a fuzzy set matching a job description fuzzy set by having a degree of overlap exceeding a threshold, computing device 104 may classify the subject as being relevant or otherwise associated with the job description. Where multiple fuzzy matches are performed, degrees of match for each respective fuzzy set may be computed and aggregated through, for instance, addition, averaging, or the like, to determine an overall degree of match.

Still referring to FIG. 11, in an embodiment, subject-specific data may be compared to multiple class fuzzy sets representing job-descriptions. For instance, subject-specific data may be represented by an individual fuzzy set that is compared to each of the multiple class fuzzy sets; and a degree of overlap exceeding a threshold between the individual fuzzy set and any of the multiple class fuzzy sets may cause computing device 104 to classify the subject as belonging to a job description. For instance, in one embodiment there may be two class fuzzy sets, representing a first job description and a second job description. First job description may have a first fuzzy set; second job description may have a second fuzzy set; and subject-specific data may have an individual fuzzy set. Computing device 104, for example, may compare an individual fuzzy set with each of first fuzzy set and second fuzzy set, as described above, and classify a subject to either, both, or neither of first job description nor second job description. Machine-learning methods as described throughout may, in a non-limiting example, generate coefficients used in fuzzy set equations as described above, such as without limitation x, c, and a of a Gaussian set as described above, as outputs of machine-learning methods. Likewise, subject-specific data may be used indirectly to determine a fuzzy set, as the fuzzy set may be derived from outputs of one or more machine-learning models that take the subject-specific data directly or indirectly as inputs. Although an exemplary application for fuzzy set matching is described above, fuzzy set matching may be used for any classifications or associations described within this disclosure.

Figure 12:
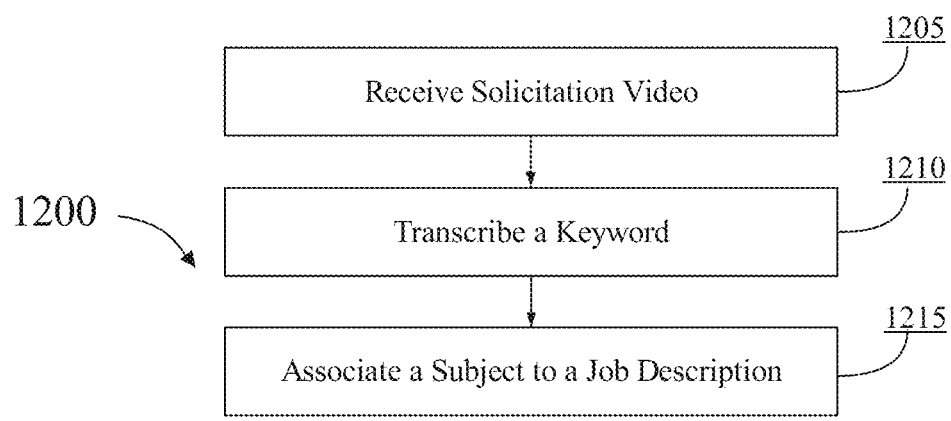
FIG. 12 is a flow diagram of an exemplary method of parsing and correlating solicitation video content.

Referring now to FIG. 12, an exemplary method 1200 of parsing and correlating solicitation video content is illustrated by way of a flow diagram. At step 1205, method 1200 may include receiving, using a computing device, a solicitation video related to a subject. Computing device may include any computing device described in this disclosure, for example with reference to FIGS. 1-11 and 10. Solicitation video may include any solicitation video described in this disclosure, for example with reference to FIGS. 1-11. Subject may include any subject described in this disclosure, for example including with reference to FIGS. 1-11. In some cases, solicitation video may include one or more of at least an image component and at least an audio component. Image component may include any image component described in this disclosure, for example including with reference to FIGS. 1-11. Audio component may include any audio component described in this disclosure, for example including with reference to FIGS. 1-11. In some case, audio component may include audible verbal content related to at least an attribute of subject. Audible verbal content may include any audible verbal content described in this disclosure, for example including with reference to FIGS. 1-11.

With continued reference to FIG. 12, at step 1210, method 1200 may include transcribing, using computing device, at least a keyword as a function of audio component. Keyword may include any keyword described in this disclosure, for example including with reference to FIGS. 1-11. In some embodiments, step 1210 may additionally include natural language processing. Natural language processing may include any natural language processing described in this disclosure, for example including with reference to FIGS. 1-11.

With continued reference to FIG. 12, at step 1215, method 1200 may include associating, using computing device, subject with at least a job description as a function of at least a keyword. Job description may include any job description described in this disclosure, for example including with reference to FIGS. 1-11. In some embodiments, step 1215 may additionally include classifying, using computing device and at least a candidate classifier, subject to at least a job description. Candidate classifier may include any classifier described in this disclosure, for example including with reference to FIGS. 1-11. In some embodiments, step 1215 may additionally include querying, using computing device, at least a job description with at least a keyword. In some embodiments, method 1200 may additionally include determining a relevance as a function of association between subject and at least a job description. Relevance may include any relevance described in this disclosure, for example including with reference to FIGS. 1-11.

Still referring to FIG. 12, in some embodiments, at least an image component may include visual non-verbal content related to at least an attribute of subject. Visual non-verbal content may include any visual non-verbal content described in this disclosure, for example including with reference to FIGS. 1-11. Attribute may include any attribute described in this disclosure, for example including with reference to FIGS. 1-11. In some cases, method 1200 may additionally include recognizing, using computing device, at least a feature as a function of visual non-verbal content and associating, using the computing device, subject with at least a job description as a function of the at least a feature. Feature may include any feature described in this disclosure, for example including with reference to FIGS. 1-11. In some cases, one or more of recognizing at least a feature and associating subject with at least a job description as a function of the at least a feature uses a machine-learning process. Machine-learning process may include any machine-learning process described in this disclosure, for example including with reference to FIGS. 1-11.

Still referring to FIG. 12, in some embodiments, one or more of transcribing at least a keyword (step 1210) and associating subject with at least a job description as a function of the at least a keyword (step 1215) uses a machine-learning process.

Still referring to FIG. 12, in some embodiments at least an image component may include visual verbal content. In some cases, method 1200 may additionally include recognizing, using computing device, at least a keyword as a function of visual verbal content and associating, using the computing device, subject with at least a job description as a function of the at least a keyword. Visual verbal content may include any visual verbal content described in this disclosure, for example including with reference to FIGS. 1-11.

Still referring to FIG. 12, in some embodiments at least an audio component may include audible non-verbal content related to at least an attribute of subject. Audible non-verbal content may include any audible non-verbal content described in this disclosure, for example including with reference to FIGS. 1-11. In some cases, method 1200 may additionally include recognizing, using computing device, at least a feature as a function of audible non-verbal content and associating, using the computing device, subject with at least a job description as a function of the at least a feature.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
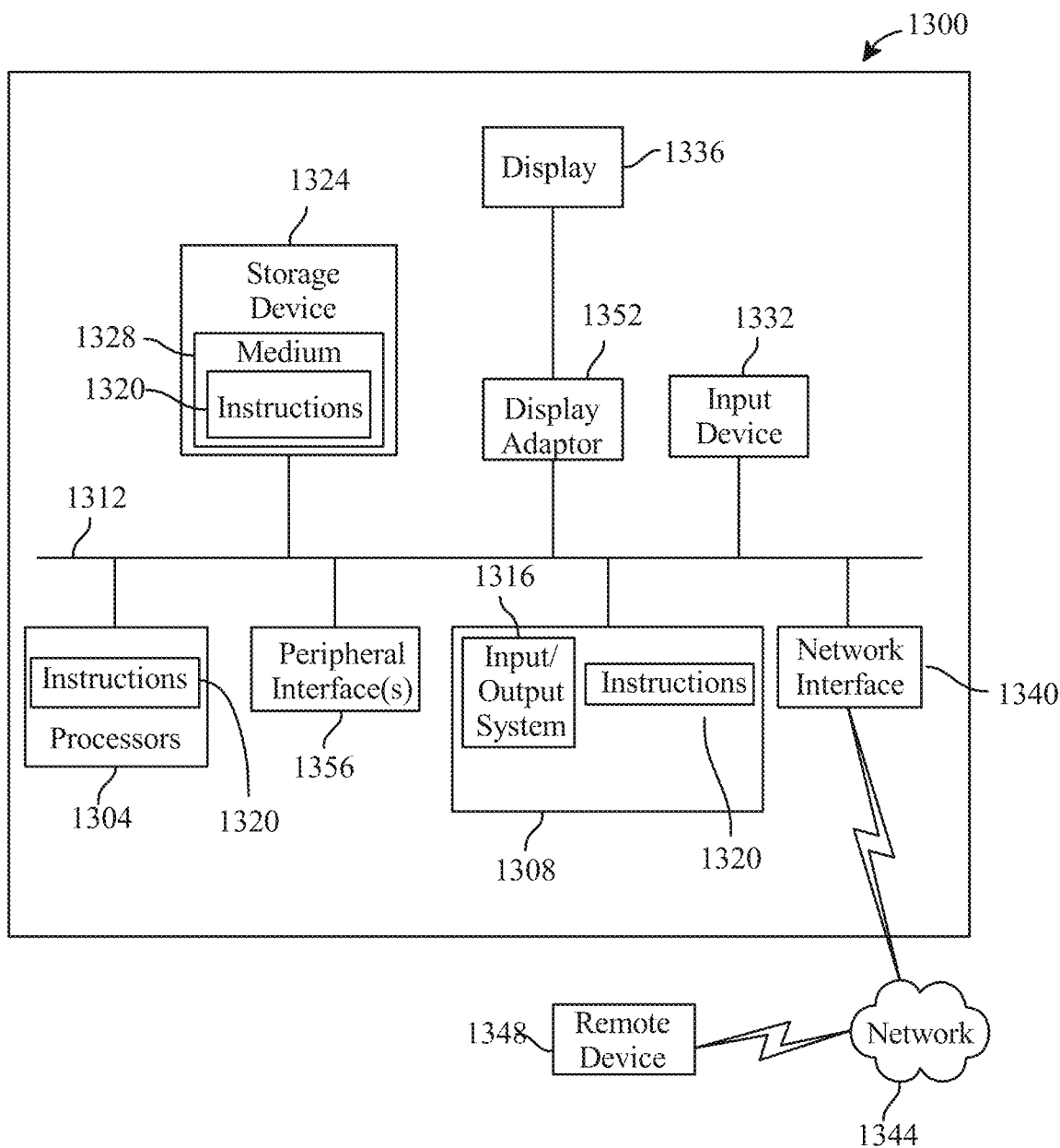
FIG. 13 is a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for parsing and correlating solicitation video content, the system comprising a computing device configured to:
   receive a solicitation video related to a subject, wherein the solicitation video comprises:
     at least an image component, wherein the at least an image component comprises non-verbal content; and
     at least an audio component, wherein the at least an audio component comprises audible verbal content related to at least an attribute of the subject;
   transcribe at least a keyword as a function of the at least an audio component using an automatic speech recognition process, wherein the automatic speech recognition process comprises performing voice recognition on the audio component in order to identify a speaker and further comprises a speaker dependent automatic speech recognition process which is a type of automatic speech recognition process that uses training that is specific to the speaker;
   classify, using a machine vision process comprising a classifier, the non-verbal content to at least a feature,
   associate the subject with at least a job description as a function of the at least a keyword and the at least a feature; and
   calculate a ranking of the subject out of a plurality of candidates, wherein the ranking is based on a description-centric ranking factor.

2. The system of claim 1, wherein the computing device is further configured to determine a relevance as a function of the association between the subject and the at least a job description.

3. The system of claim 2, wherein the at least a job description comprises a plurality of job descriptions.

4. The system of claim 3, wherein the computing device is further configured to rank each job description of the plurality of job descriptions as a function of the relevance of the association between the subject and the at least a job description.

5. The system of claim 1, wherein the at least a feature comprises a feature representing an attribute of a manner of dress of the subject.

6. The system of claim 1, wherein associating the subject with the at least a job description comprises querying a plurality of job descriptions for a presence of the at least a keyword, wherein querying the plurality of job descriptions for the presence of the at least a keyword comprises performing a text search of the plurality of job descriptions for the at least a keyword.

7. The system of claim 1, wherein classifying the non-verbal content to at least a feature comprises classifying the non-verbal content to at least a feature using pose estimation.

8. The system of claim 1, wherein the at least a feature comprises a feature representing an attribute of a facial expression of the subject.

9. A method for parsing and correlating solicitation video content, the method comprising:
   receiving, by a computing device, a solicitation video related to a subject, wherein the solicitation video comprises:
     at least an image component, wherein the at least an image component comprises non-verbal content; and
     at least an audio component, wherein the at least an audio component comprises audible verbal content related to at least an attribute of the subject;
   transcribing, by the computing device, at least a keyword as a function of the at least an audio component using an automatic speech recognition process, wherein the automatic speech recognition process comprises performing voice recognition on the audio component in order to identify a speaker and further comprises a speaker dependent automatic speech recognition process which is a type of automatic speech recognition process that uses training that is specific to the speaker;
   classifying, by the computing device using a machine vision process comprising a classifier, the non-verbal content to at least a feature;
   associating, by the computing device, the subject with at least a job description as a function of the at least a keyword and the at least a feature; and
   calculating, by the computing device, a ranking of the subject out of a plurality of candidates, wherein the ranking is based on a description-centric ranking factor.

10. The method of claim 9, wherein the at least a feature comprises a feature representing an attribute of a manner of dress of the subject.

11. The method of claim 9, wherein associating the subject with the at least a job description comprises querying a plurality of job descriptions for a presence of the at least a keyword, wherein querying the plurality of job descriptions for the presence of the at least a keyword comprises performing a text search of the plurality of job descriptions for the at least a keyword.

12. The method of claim 9, further comprising determining, by the computing device, a relevance as a function of the association between the subject and the at least a job description.

13. The method of claim 12, wherein the at least a job description comprises a plurality of job descriptions.

14. The method of claim 13, further comprising ranking, by the computing device, each job description of the plurality of job descriptions as a function of the relevance of the association between the subject and the at least a job description.

15. The method of claim 9, wherein classifying the non-verbal content to at least a feature comprises classifying the non-verbal content to at least a feature using pose estimation.

16. The method of claim 9, wherein the at least a feature comprises a feature representing an attribute of a facial expression of the subject.

* * * * *